US 8,250,288 B2

(12) United States Patent
Chang

(10) Patent No.: US 8,250,288 B2
(45) Date of Patent: Aug. 21, 2012

(54) FLASH MEMORY STORAGE SYSTEM AND CONTROLLER AND DATA PROTECTION METHOD THEREOF

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 498 days.

(21) Appl. No.: 12/353,686

(22) Filed: Jan. 14, 2009

(65) Prior Publication Data
US 2010/0115184 A1 May 6, 2010

(30) Foreign Application Priority Data
Nov. 4, 2008 (TW) .............................. 97142579 A

(51) Int. Cl.
*G06F 13/00* (2006.01)
*G06F 13/28* (2006.01)
*H04L 9/32* (2006.01)
(52) U.S. Cl. ................ 711/103; 711/154; 711/E12.091; 713/181
(58) Field of Classification Search .................. 711/103, 711/154, E12.091; 713/181
See application file for complete search history.

(56) References Cited

U.S. PATENT DOCUMENTS

2002/0049909 A1* 4/2002 Jackson et al. ................ 713/188
2008/0263621 A1* 10/2008 Austerlitz et al. ............ 725/139

* cited by examiner

*Primary Examiner* — Edward Dudek, Jr.
(74) *Attorney, Agent, or Firm* — J.C. Patents

(57) ABSTRACT

A flash memory storage system including a controller and a flash memory chip is provided, wherein the controller is disposed with a rewritable non-volatile memory. When the controller writes a security data into the flash memory chip, the controller randomly generates a data token and generates a message digest according to the security data and the data token by using a one-way hash function, wherein the data token and the message digest are respectively stored in the rewritable non-volatile memory and the flash memory chip. Subsequently, when the controller reads the security data from the flash memory chip, the controller determinates whether the security data is falsified according to the data token and the message digest respectively stored in the rewritable non-volatile memory and the flash memory chip. Thereby, the security data in the flash memory chip can be effectively protected.

19 Claims, 3 Drawing Sheets

FLASH MEMORY STORAGE SYSTEM AND CONTROLLER AND DATA PROTECTION METHOD THEREOF

CROSS-REFERENCE TO RELATED APPLICATION

This application claims the priority benefit of Taiwan application serial no. 97142579, filed on Nov. 4, 2008. The entirety of the above-mentioned patent application is hereby incorporated by reference herein and made a part of specification.

BACKGROUND

1. Technology Field

The present invention generally relates to a flash memory storage system, and more particularly, to a flash memory storage system with a data protection function, and a controller and a data protection method thereof.

2. Description of Related Art

Smart cards have been broadly used along with the widespread of e-wallet and prepayment applications. A smart card is an integrated circuit (IC) card embedded with such components as a microprocessor, a card operating system, a security module, and a memory which allow a card holder to perform various predetermined operations. Besides the function of data storage, a smart card also offers calculation, encryption, bidirectional communication, and security functions such that data stored in the smart card can be protected. A subscriber identification module (SIM) card used in a GSM (Global System for Mobile Communications) cellular phone is one of the applications of smart card. Generally speaking, a smart card has very limited storage capacity due to the limited scales of ICs therein.

A memory card is a data storage equipment and which usually uses a NAND flash memory as its storage medium. A NAND flash memory is rewritable and erasable, and data stored in a NAND flash memory is retained even when no power is supplied to the NAND flash memory. In addition, along with the advancement of the fabricating technique, a NAND flash memory offers many other advantages, such as small volume, high access speed, and low power consumption, etc. Thus, in recent years, people in the industry have been trying to integrate smart card with large-capacity memory card in order to increase the storage capacity of smart card.

However, when a smart card and a memory card are integrated, security data is stored in the memory card but not in the original IC chip. Accordingly, how to ensure the security of data stored in the memory card is the key of whether the application can succeed. For example, if a user deposits $1000 in a smart card (for example, a prepaid card used in a shop) which uses a memory card as its storage medium and uses this smart card to make a payment, since the memory card is an independent circuit, the user can make a hard copy of the data in the memory card after the user determines the position of the memory card in the smart card. After the payment is made, the user can store the hard copy back into the memory card to refresh the value in the memory card. Thereby, how to protect the security of data in a flash memory is one of the most focused subjects in the industry.

SUMMARY

Accordingly, the present invention is directed to a flash memory storage system which can effectively ensure the reliability of data stored therein.

The present invention is directed to a controller which can effectively ensure the reliability of data stored in a flash memory chip.

The present invention is directed to a data protection method which can effectively ensure the reliability of data stored in a flash memory chip.

The present invention provides a flash memory storage system including a controller and a flash memory chip. The controller has a rewritable non-volatile memory, and the flash memory chip is electrically connected to the controller. When the controller writes security data into the flash memory chip, the controller generates a data token corresponding to the security data and generates a corresponding message digest according to the security data and the data token by using a one-way hash function, and the controller respectively stores the data token and the corresponding message digest in the rewritable non-volatile memory and the flash memory chip. Subsequently, when the controller reads the security data from the flash memory chip, the controller reads the data token from the rewritable non-volatile memory and generates a comparative message digest according to the security data and the data token by using the one-way hash function, and the controller reads the corresponding message digest from the flash memory chip and determines whether the corresponding message digest matches the comparative message digest. The controller outputs a warning message if the controller determines that the corresponding message digest does not match the comparative message digest.

The present invention provides a controller suitable for a flash memory storage system having a flash memory chip. The controller includes a microprocessor unit, a rewritable non-volatile memory, a data token generation unit, a message digest generation unit, and a flash memory interface module. When the microprocessor unit writes security data into the flash memory chip, the data token generation unit generates a data token corresponding to the security data, the message digest generation unit generates a corresponding message digest according to the security data and the data token by using a one-way hash function, and the microprocessor unit stores the data token and the corresponding message digest respectively in the rewritable non-volatile memory and the flash memory chip. Subsequently, when the microprocessor unit reads the security data from the flash memory chip, the microprocessor unit reads the data token from the rewritable non-volatile memory, the message digest generation unit generates a comparative message digest according to the security data and the data token by using the one-way hash function, and the microprocessor unit reads the corresponding message digest from the flash memory chip and determines whether the corresponding message digest matches the comparative message digest, wherein the microprocessor unit outputs a warning message if the microprocessor unit determines that the corresponding message digest does not match the comparative message digest.

The present invention provides a data protection method suitable for protecting security data stored in a flash memory chip of a flash memory storage system. In the data protection method, a rewritable non-volatile memory is disposed in a controller of the flash memory storage system. While writing the security data into the flash memory chip, a data token corresponding to the security data is generated, a corresponding message digest is generated according to the security data and the data token by using a one-way hash function, and the data token and the corresponding message digest are respectively stored in the rewritable non-volatile memory and the flash memory chip. While reading the security data from the flash memory chip, the data token is read from the rewritable non-volatile memory, a comparative message digest is generated according to the security data and the data token by using the one-way hash function, the corresponding message digest is read from the flash memory chip, and whether the corresponding message digest matches the comparative message digest is determined, wherein a warning message is output if the corresponding message digest does not match the comparative message digest.

In the present invention, a data token is generated every time when a security data is updated, and a rewritable non-volatile memory is disposed in the controller for storing the data token. Subsequently, whether the security data is falsified is verified by using a comparative message digest which is generated according to the data token. Thereby, the reliability of the security data is ensured.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Figure 1:
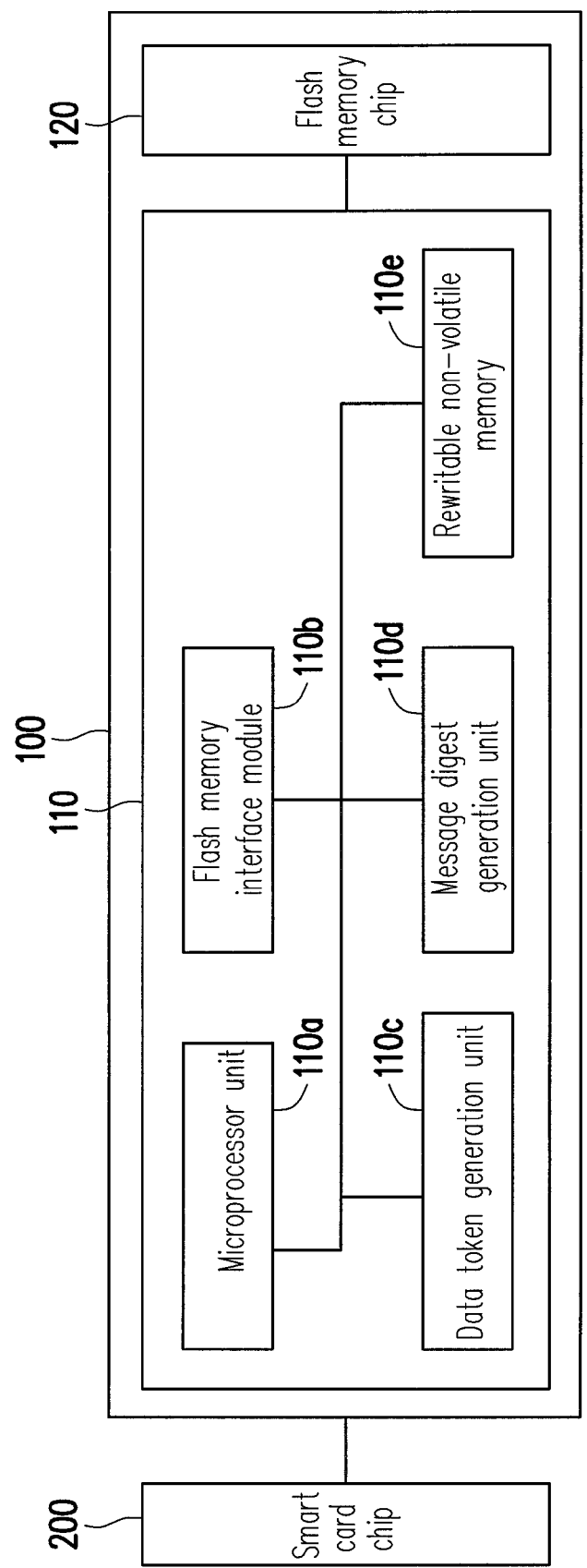
FIG. 1 is a schematic block diagram of a flash memory storage system according to an exemplary embodiment of the present invention.

Reference will now be made in detail to the present preferred exemplary embodiments of the invention, examples of which are illustrated in the accompanying drawings. Wherever possible, the same reference numbers are used in the drawings and the description to refer to the same or like parts.

FIG. 1 is a schematic block diagram of a flash memory storage system according to an exemplary embodiment of the present invention. Referring to FIG. 1, the flash memory storage system 100 includes a controller (also referred to as a controller system) 110 and a flash memory chip 120.

The flash memory storage system 100 has a data protection function provided by the present exemplary embodiment. Thus, the flash memory storage system 100 can be used for storing security data which is to be protected. For example, in the present exemplary embodiment, the flash memory storage system 100 is integrated with a smart card and used as a storage medium for storing security data of the smart cards. The data protection method in the present exemplary embodiment will be described in detail below. In the present exemplary embodiment, the flash memory storage system 100 is a small-volume memory card chip and which can be conveniently integrated with an existing smart card chip 200. However, in another exemplary embodiment of the present invention, the flash memory storage system 100 may also be a flash drive or a solid state drive (SSD) such that the security data of a user can be protected when the user uses the flash drive or SSD.

The controller 110 executes a plurality of logic gates or machine instructions implemented as hardware or firmware to perform various data operations to the flash memory chip 120. The controller 110 includes a microprocessor unit 110a, a flash memory interface module 110b, a data token generation unit 110c, a message digest generation unit 110d, and a rewritable non-volatile memory 110e.

The microprocessor unit 110a cooperates with the flash memory interface module 110b, the data token generation unit 110c, the message digest generation unit 110d, and the rewritable non-volatile memory 110e to carry out various operations of the flash memory storage system 100. Particularly, in the present exemplary embodiment, when the smart card chip 200 integrated with the flash memory storage system 100 accesses the security data stored in the flash memory chip 120, the microprocessor unit 110a determines whether the security data to be read is falsified, and if the security data is falsified, the microprocessor unit 110a sends a warning message to the smart card chip 200 to notify the smart card chip 200 that the security data is not reliable so that the smart card chip 200 will not perform any operation to the falsified security data.

The flash memory interface module 110b is electrically connected to the microprocessor unit 110a for accessing the flash memory chip 120. Namely, data to be written into the flash memory chip 120 is converted by the flash memory interface module 110b into a format acceptable to the flash memory chip 120.

The data token generation unit 110c is electrically connected to the microprocessor unit 110a. In the present exemplary embodiment, the data token generation unit 110c is a random number generator. Every time when the microprocessor unit 110a writes a security data into the flash memory chip 120, the data token generation unit 110c generates a data token corresponding to the security data. To be specific, the data token is a random number, and a message digest or a message authentication code (MAC) is generated according to the data token and the security data. In particular, the microprocessor unit 110a stores the data token generated by the data token generation unit 110c in the rewritable non-volatile memory 110e, and subsequently, the microprocessor unit 110a reads the data token to verify the reliability of the security data.

It should be mentioned that in another exemplary embodiment of the present invention, the data token generation unit 110c may also generate the data token sequentially or according to a fixed rule. For example, the data token generation unit 110c may use serial numbers 1, 2, 3 . . . as data tokens. In addition, the data token generation unit 110c may also use a specific data (for example, a processing time of the data) received by the microprocessor unit 110a as the data token, or the data token generation unit 110c may further encode the specific data and then serve the encoded data as the data token.

The message digest generation unit 110d is electrically connected to the microprocessor unit 110a. In the present exemplary embodiment, the message digest generation unit 110d generates a message digest according to an input message by using a one-way hash function. In particular, the microprocessor unit 110a stores the message digest generated by the message digest generation unit 110d in the flash memory chip 120, and subsequently, the microprocessor unit 110a reads the message digest to verify the reliability of the security data.

In the present exemplary embodiment, the one-way hash function in the message digest generation unit 110d is implemented with SHA-256. However, the present invention is not limited thereto, and in another exemplary embodiment of the present invention, the one-way hash function in the message digest generation unit 110d may also be implemented with MD5, RIPEMD-160 SHA1, SHA-386, SHA-512, or other suitable functions.

It should be mentioned that in the present exemplary embodiment, the data token generation unit 110c and the message digest generation unit 110d are implemented in the controller 110 as hardware. However, in another exemplary embodiment of the present invention, the data token generation unit 110c and the message digest generation unit 110d may also be implemented in the controller 110 as firmware. For example, the data token generation unit 110c and the message digest generation unit 110d may be implemented in the controller 110 as machine instructions written in a programming language and stored in a program memory (for example, a read only memory—ROM). When the flash memory storage system 100 is in operation, the machine instructions of the data token generation unit 110c and the message digest generation unit 110d may be indirectly loaded into a buffer memory (not shown) of the controller 110 and executed by the microprocessor unit 110a, or the machine instructions may also be directly executed by the microprocessor unit 110a, to execute foregoing data protection steps.

In another exemplary embodiment of the present invention, the machine instructions of the data token generation unit 110c and the message digest generation unit 110d may also be stored into a specific area (for example, a system area) of the flash memory chip 120 as software. Similarly, when the flash memory storage system 100 is in operation, the machine instructions of the data token generation unit 110c and the message digest generation unit 110d are loaded into a buffer memory (not shown) of the controller 110 and executed by the microprocessor unit 110a.

The rewritable non-volatile memory 110e is electrically connected to the microprocessor unit 110a. In the present exemplary embodiment, the rewritable non-volatile memory 110e is used for storing the data token. As described above, the data token is integrated with the security data, and the message digest generation unit 110d generates the corresponding message digest according to the data token and the security data. Thus, the data length of the data token is not very large. Accordingly, in the present exemplary embodiment, the rewritable non-volatile memory 110e is implemented as a rewritable non-volatile memory of 16 bits (or 36 bits).

Even though not shown in the present exemplary embodiment, the controller 110 may further include other functional modules for controlling the flash memory chip, such as a buffer memory (for example, a static random access memory—SRAM), an error correction module, and a power management module, etc.

In another exemplary embodiment of the present invention, when the flash memory storage system 100 is implemented as a flash drive or a SSD, the flash memory storage system 100 further includes a connector (not shown) for connecting to a host system (for example, a personal computer). Meanwhile, the controller 110 further includes a host interface module (not shown) which is electrically connected to microprocessor unit 110a for receiving and identifying instructions received from the host system. Namely, in the example that the flash memory storage system 100 is implemented as a flash drive or a SSD, the instructions and data received from a host system connected to the flash memory storage system 100 are transmitted to the microprocessor unit 110a through the connector and the host interface module. The connector and the host interface module may respectively be a USB connector and a USB interface, a PCI Express connector and a PCI Express interface, an IEEE 1394 connector and an IEEE 1394 interface, a SD connector and a SD interface, a MS connector and a MS interface, a MMC connector and a MMC interface, a SATA connector and a SATA interface, a PATA connector and a PATA interface, a CF connector and a CF interface, an IDE connector and an IDE interface, or other suitable connector and data transmission interface.

As described above, when a security data is written into the flash memory storage system 100 provided by the present exemplary embodiment, the data token generation unit 110c randomly generates a data token corresponding to the security data, the message digest generation unit 110d generates a corresponding message digest according to the security data and the data token, and the microprocessor unit 110a stores the security data and the message digest in the flash memory chip 120 and stores the data token in the rewritable non-volatile memory 110e of the controller 110. Subsequently, when the flash memory storage system 100 reads the security data, the microprocessor unit 110a reads the security data and the message digest from the flash memory chip 120 and reads the data token from the rewritable non-volatile memory 110e, and the message digest generation unit 110d generates a comparative message digest according to the security data and the data token read by the microprocessor unit 110a so that the microprocessor unit 110a can determine whether the security data is reliable according to the comparative message digest and the message digest. Below, the data protection method in the present exemplary embodiment will be described in detail with reference to FIG. 2 and FIG. 3.

Figure 2:
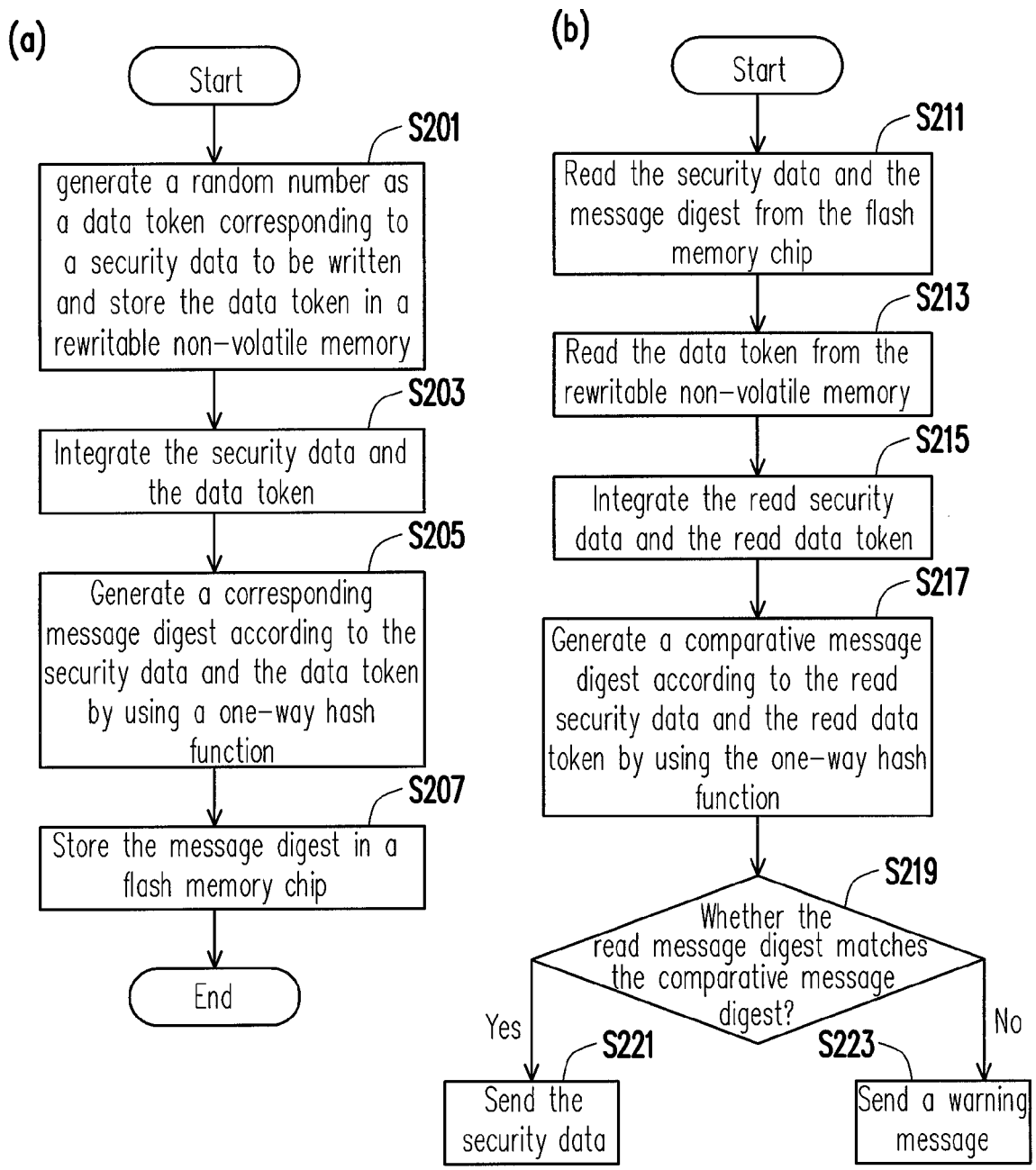
FIG. 2 is a flowchart of a data protection method according to an exemplary embodiment of the present invention.
Figure 3:
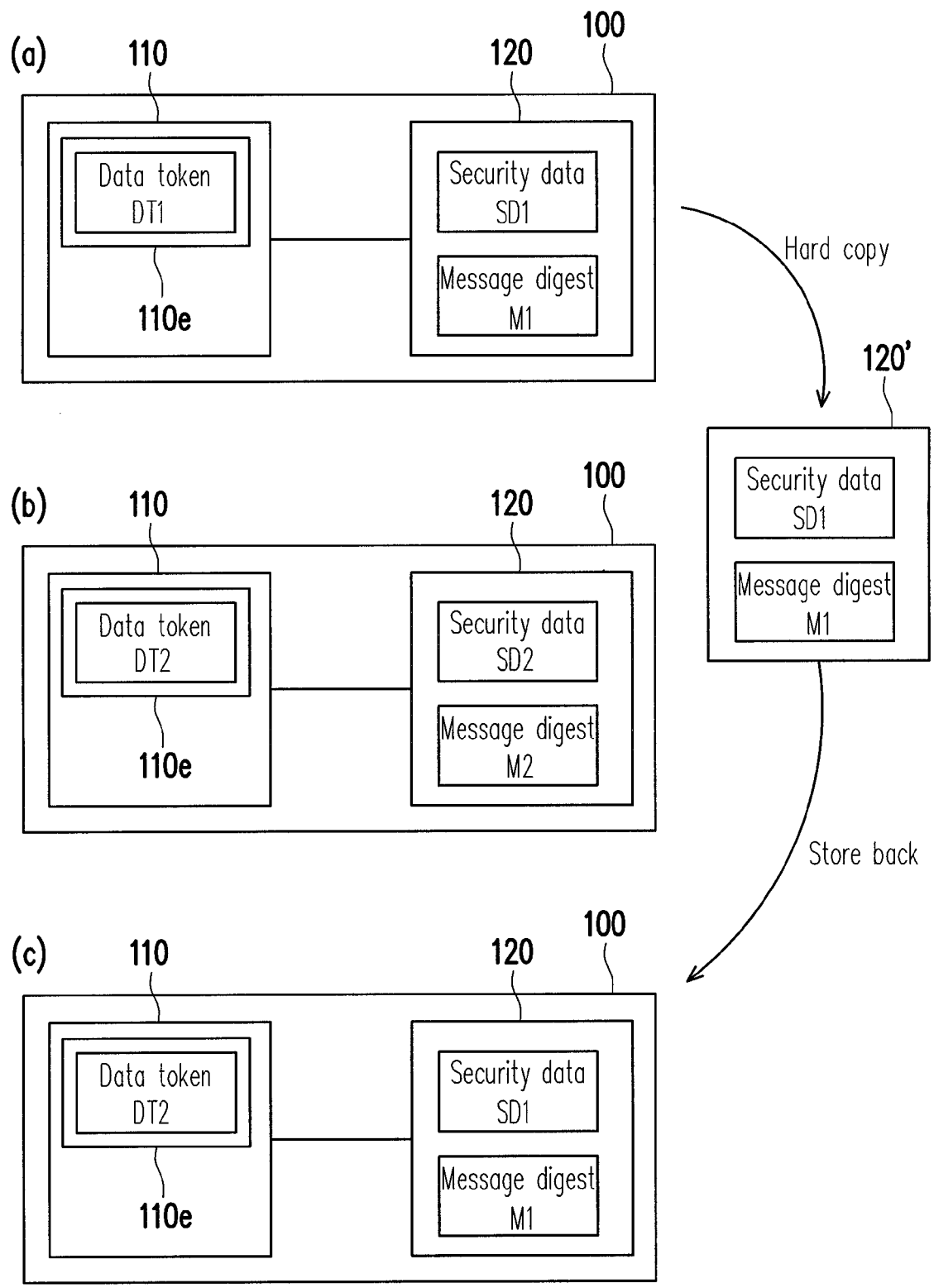
FIG. 3 is a diagram illustrating how to determine the reliability of a security data according to an exemplary embodiment of the present invention.

FIG. 2 is a flowchart of the data protection method according to an exemplary embodiment of the present invention, and FIG. 3 is a diagram illustrating how to determine the reliability of a security data according to an exemplary embodiment of the present invention.

Referring to FIG. 2(a) and FIG. 3(a), when the smart card chip 200 requests the microprocessor unit 110a of the controller 110 to write a security data (for example, the security data SD1 in FIG. 3) into the flash memory chip 120, in step S201, the data token generation unit 110c of the controller 110 randomly generates a random number as a data token corresponding to the security data, and the microprocessor unit 110a stores the data token (for example, the data token DT1 in FIG. 3) into the rewritable non-volatile memory 110e. To be specific, the data token generation unit 110c randomly generates a different-data token every time when a security data is written or updated.

Next, in step S203, the microprocessor unit 110a integrates the security data and the data token and sends the integrated security data and data token to the message digest generation unit 110d. After that, in step S205, the message digest generation unit 110d generates a corresponding message digest according to the integrated security data and data token by using a one-way hash function.

Finally, in step S207, the microprocessor unit 110a stores the message digest (for example, the message digest M1 in FIG. 3) into the flash memory chip 120.

Subsequently, when the smart card chip 200 integrated with the flash memory storage system 100 is about to read a security data (for example, the security data SD1 in FIG. 3), referring to FIG. 2(b), in step S211, the microprocessor unit 110a in the controller 110 reads the security data (for example, the security data SD1 in FIG. 3) and the message digest (for example, the message digest M1 in FIG. 3) from the flash memory chip 120.

Then, in step S213, the microprocessor unit 110a in the controller 110 reads the data token (for example, the data token DT1 in FIG. 3) from the rewritable non-volatile memory 110e.

After that, in step S215, the microprocessor unit 110*a* integrates the read security data and the read data token and sends the integrated security data and data token to the message digest generation unit 110*d*, and in step S217, the message digest generation unit 110*d* generates a comparative message digest according to the read security data and the read data token by using the one-way hash function and sends the comparative message digest to the microprocessor unit 110*a*.

In step S219, the microprocessor unit 110*a* in the controller 110 determines whether the message digest matches the comparative message digest generated by the message digest generation unit 110*d*.

If in step S219, the microprocessor unit 110*a* determines that the message digest matches the comparative message digest generated by the message digest generation unit 110*d*, the controller 110 sends the security data to the smart card chip 200 in step S221.

If in step S219, the microprocessor unit 110*a* determines that the message digest does not match the comparative message digest generated by the message digest generation unit 110*d*, in step S223, the controller 110 sends a warning message to the smart card chip 200 to notify the smart card chip 200 that the security data is falsified. For example, when the security data SD1 in FIG. 3(*a*) is read, since the microprocessor unit 110*a* determines that the comparative message digest calculated according to the security data SD1 and the data token DT1 is that same as the message digest M1, the controller 110 sends the security data to the smart card chip 200.

Referring to FIG. 3(*b*), when a user uses a smart card to make payment, as shown in FIG. 2(*a*), the controller 110 of the flash memory storage system 100 updates the security data SD1 in the flash memory chip 120 into a security data SD2, generates a new data token DT2 to replace the data token DT1 in the rewritable non-volatile memory, and generates a new message digest M2 to replace the message digest M1 in the flash memory chip 120.

Referring to FIG. 3(*c*), if the user stores a hard copy of the security data SD1 and the message digest M1 in the flash memory chip 120 (as shown in FIG. 3(*a*)) into a flash memory chip 120' before making the payment in FIG. 3(*b*), and the user stores the security data SD1 and the message digest M1 back into the flash memory chip 120 after the process in FIG. 3(*b*) is finished, the security data SD2 and the message digest M2 in the flash memory chip 120 will be falsified to the security data SD1 and the message digest M1 before the process.

In the state illustrated in FIG. 3(*c*), if the smart card chip 200 is about to read the security data, the controller 110 of the flash memory storage system 100 calculates a comparative message digest according to the security data SD1 and the data token DT2 through the steps illustrated in FIG. 2(*b*). Herein, since the message digest M1 in the flash memory chip 120 is generated according to the security data SD1 and the data token DT1, the comparative message digest calculated according to the security data SD1 and the data token DT2 must be different from the message digest M1. Accordingly, the controller 110 sends a warning message to the smart card chip 200 to notify it that the security data is falsified (step S223 in FIG. 2(*b*)).

In another exemplary embodiment of the present invention, in order to avoid collision between two data tokens (i.e., the two data tokens being the same), in step S201 of FIG. 2(*a*), if the data token is the same as an original data token, a new data token is generated.

In addition, the sequence of the steps illustrated in FIG. 2 is not intended for limiting the present invention, and those skilled in the art should be able to implement the present invention in other sequences without departing from the scope and spirit of the present invention.

As described above, in the present invention, a rewritable non-volatile memory is disposed in a controller of a flash memory storage system for storing a random data token, and a message digest is generated according to the data token and a security data to be written. Thereby, when someone tries to restore a security data in the flash memory chip by making a hard copy of the security data, the controller can determine whether the security data is falsified according to a comparative message digest which is calculated according to the data token. Accordingly, the reliability of the security data in the flash memory storage system can be effectively ensured, and data security can be effectively ensured in an application wherein a flash memory and a smart card are integrated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory storage system, comprising:
a controller, having a rewritable non-volatile memory; and
a flash memory chip, electrically connected to the controller;
wherein when the controller writes a security data in the flash memory chip, the controller uses a processing time of writing the security data in the flash memory chip as a data token corresponding to the security data, generates a corresponding message digest according to the security data and the data token by using a one-way hash function, stores the data token in the rewritable non-volatile memory, and stores the corresponding message digest in the flash memory chip, and
wherein when the controller reads the security data from the flash memory chip, the controller reads the data token from the rewritable non-volatile memory, generates a comparative message digest according to the read security data and the read data token by using the one-way hash function, reads the corresponding message digest from the flash memory chip, and determines whether the read corresponding message digest matches the comparative message digest, and the controller outputs a warning message if the controller determines that the corresponding message digest does not match the comparative message digest.

2. The flash memory storage system according to claim 1, wherein the controller further comprises a data token generation unit for generating the data token.

3. The flash memory storage system according to claim 2, wherein the data token generation unit randomly or sequentially generates the data token.

4. The flash memory storage system according to claim 2, wherein the data token generation unit generates the data token according to a specific data received by the controller.

5. The flash memory storage system according to claim 1, wherein the controller further comprises a message digest generation unit for generating the message digest and the comparative message digest by using the one-way hash function.

6. The flash memory storage system according to claim 1, wherein a capacity of the rewritable non-volatile memory in the controller is 16 bits or 32 bits.

7. The flash memory storage system according to claim 1, wherein the one-way hash function comprises MD5, RIPEMD-160 SHA1, SHA-256, SHA-386, or SHA-512.

8. The flash memory storage system according to claim 1, further comprising a connector, wherein the connector is electrically connected to the controller and is used for connecting to a host system.

9. A controller, suitable for a flash memory storage system having a flash memory chip, the controller comprising:
  a microprocessor unit;
  a rewritable non-volatile memory, electrically connected to the microprocessor unit;
  a data token generation unit, electrically connected to the microprocessor unit;
  a message digest generation unit, electrically connected to the microprocessor unit; and
  a flash memory interface module, electrically connected to the microprocessor unit,
  wherein when the microprocessor unit writes a security data into the flash memory chip, the data token generation unit uses a processing time of writing the security data in the flash memory chip as a data token corresponding to the security data, the message digest generation unit generates a corresponding message digest according to the security data and the data token by using a one-way hash function, and the microprocessor unit stores the data token and the corresponding message digest respectively into the rewritable non-volatile memory and the flash memory chip, and
  wherein when the microprocessor unit reads the security data from the flash memory chip, the microprocessor unit reads the data token from the rewritable non-volatile memory, the message digest generation unit generates a comparative message digest according to the read security data and the read data token by using the one-way hash function, and the microprocessor unit reads the corresponding message digest from the flash memory chip and determines whether the read corresponding message digest matches the comparative message digest, and the microprocessor unit outputs a warning message if the microprocessor unit determines that the corresponding message digest does not match the comparative message digest.

10. The controller according to claim 9, wherein the data token generation unit randomly or sequentially generates the data token.

11. The controller according to claim 9, wherein the data token generation unit generates the data token according to a specific data received by the microprocessor unit.

12. The controller according to claim 9, wherein a capacity of the rewritable non-volatile memory in the controller is 16 bits or 32 bits.

13. The controller according to claim 9, wherein the one-way hash function comprises MD5, RIPEMD-160 SHA1, SHA-256, SHA-386, or SHA-512.

14. The controller according to claim 9, further comprising a host interface module, wherein the host interface module is electrically connected to the microprocessor unit and is used for connecting to a host system.

15. A data protection method, suitable for protecting a security data stored in a flash memory chip of a flash memory storage system, the data protection method comprising:
  disposing a rewritable non-volatile memory in a controller of the flash memory storage system;
  while writing the security data into the flash memory chip, using a processing time of writing the security data in the flash memory chip as a data token corresponding to the security data, generating a corresponding message digest according to the security data and the data token by using a one-way hash function, storing the data token in the rewritable non-volatile memory, and storing the corresponding message digest in the flash memory chip; and
  while reading the security data from the flash memory chip, reading the data token from the rewritable non-volatile memory, generating a comparative message digest according to the read security data and the read data token by using the one-way hash function, reading the corresponding message digest from the flash memory chip, and determining whether the read corresponding message digest matches the comparative message digest,
  wherein a warning message is output if the corresponding message digest does not match the comparative message digest.

16. The data protection method according to claim 15, wherein the step of generating the data token corresponding to the security data comprises randomly or sequentially generating the data token.

17. The data protection method according to claim 15, wherein the step of generating the data token corresponding to the security data comprises generating the data token according to a specific data received by the controller.

18. The data protection method according to claim 15, wherein a capacity of the rewritable non-volatile memory disposed in the controller of the flash memory storage system is 16 bits or 32 bits.

19. The data protection method according to claim 15, wherein the one-way hash function comprises MD5, RIPEMD-160 SHA1, SHA-256, SHA-386, or SHA-512.

* * * * *